United States Patent
Schohn et al.

(10) Patent No.: US 7,565,605 B2
(45) Date of Patent: Jul. 21, 2009

(54) REORGANIZING CONTENT OF AN ELECTRONIC DOCUMENT

(75) Inventors: Gregory C. Schohn, Durham, NC (US);
Adam L. Berger, Pittsburgh, PA (US);
Richard D. Romero, Pittsburgh, PA (US)

(73) Assignee: Nokia, Inc., Irving, TX (US)

( * ) Notice: Subject to any disclaimer, the term of this patent is extended or adjusted under 35 U.S.C. 154(b) by 571 days.

(21) Appl. No.: 09/851,404

(22) Filed: May 8, 2001

(65) Prior Publication Data
US 2003/0046318 A1 Mar. 6, 2003

(51) Int. Cl.
*G06F 17/00* (2006.01)
(52) U.S. Cl. .................. 715/249; 715/208; 715/234; 715/276; 709/203; 709/217
(58) Field of Classification Search .................. 715/514, 715/505, 523, 512, 501.1, 826, 205, 221, 715/230, 235, 249, 208, 234, 276; 345/826, 345/854, 866; 455/415, 461, 422.1; 709/217, 709/223, 228, 203
See application file for complete search history.

(56) References Cited

U.S. PATENT DOCUMENTS

| | | | |
|---|---|---|---|
| 1,261,167 A | 4/1918 | Russell | |
| 1,435,663 A | 11/1922 | Odell | |
| 5,608,874 A | 3/1997 | Ogawa et al. | 709/246 |
| 5,625,781 A | 4/1997 | Cline et al. | |
| 5,704,029 A * | 12/1997 | Wright, Jr. | 715/505 |
| 5,742,668 A * | 4/1998 | Pepe et al. | 455/415 |
| 5,742,905 A * | 4/1998 | Pepe et al. | 455/461 |
| 5,801,691 A * | 9/1998 | Dahl | 715/746 |
| 5,809,415 A * | 9/1998 | Rossmann | 455/422.1 |
| 6,012,074 A * | 1/2000 | Lucas et al. | 715/531 |
| 6,012,098 A | 1/2000 | Bayeh et al. | 709/246 |
| 6,076,109 A | 6/2000 | Kikinis | 709/228 |
| 6,081,815 A * | 6/2000 | Spitznagel et al. | 715/501.1 |
| 6,119,155 A | 9/2000 | Rossmann et al. | 709/219 |
| 6,128,663 A | 10/2000 | Thomas | |
| 6,154,738 A | 11/2000 | Call | |
| 6,161,140 A | 12/2000 | Moriya | |
| 6,178,461 B1 | 1/2001 | Chan et al. | 709/247 |
| 6,226,675 B1 | 5/2001 | Meltzer et al. | |
| 6,247,048 B1 | 6/2001 | Greer et al. | 709/219 |
| 6,253,239 B1 | 6/2001 | Shklar et al. | 709/217 |
| 6,278,449 B1 | 8/2001 | Sugiarto et al. | |
| 6,279,014 B1 * | 8/2001 | Schilit et al. | 715/512 |
| 6,298,357 B1 | 10/2001 | Wexler et al. | 715/513 |

(Continued)

OTHER PUBLICATIONS

Editor,"WAP Review: It's all about the mobile web", Oct. 28, 2005, downloaded from <http://wapreview.com/blog/?p26, p27, p28, p29>, 17 pages.*

(Continued)

*Primary Examiner*—Doug Hutton
*Assistant Examiner*—James H Blackwell
(74) *Attorney, Agent, or Firm*—Alston & Bird LLP

(57) ABSTRACT

An electronic document is received that represents serial data that contains content of the document and defines an order in which respective portions of the content are to be performed. The serial data of the electronic document is analyzed. Reorganization information is generated for use in delivering the portions of the content, the reorganization information enabling performance in an order different from the order defined by the serial data.

53 Claims, 13 Drawing Sheets

U.S. PATENT DOCUMENTS

Figure 1B:
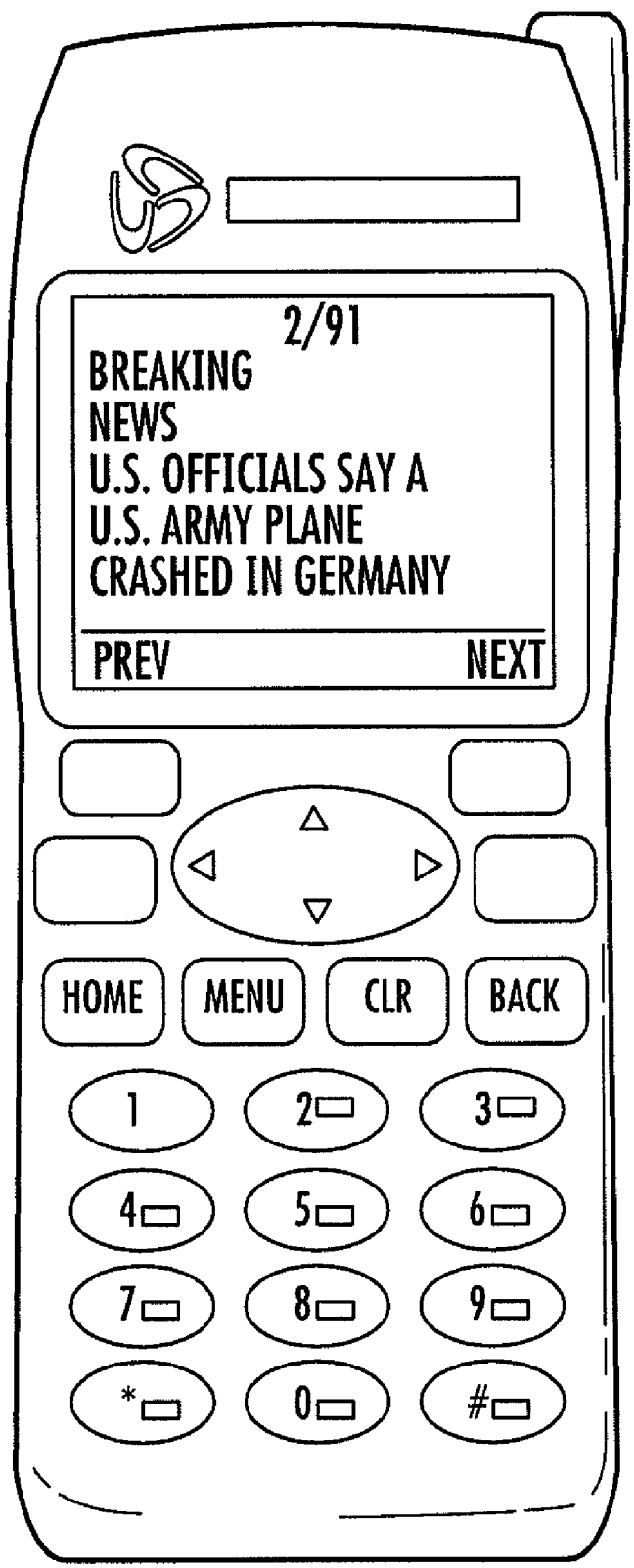

| | | | |
|---|---|---|---|
| 6,300,947 B1* | 10/2001 | Kanevsky | 345/866 |
| 6,311,197 B2 | 10/2001 | Mighdoll et al. | 715/513 |
| 6,317,781 B1 | 11/2001 | De Boor et al. | |
| 6,327,616 B1 | 12/2001 | Ohto et al. | 709/219 |
| 6,336,124 B1 | 1/2002 | Alam et al. | 715/523 |
| 6,347,340 B1 | 2/2002 | Coelho et al. | 709/246 |
| 6,356,529 B1 | 3/2002 | Zarom | 370/231 |
| 6,446,066 B1 | 9/2002 | Horowitz | 707/5 |
| 6,457,026 B1* | 9/2002 | Graham et al. | 715/512 |
| 6,457,030 B1* | 9/2002 | Adams et al. | 715/523 |
| 6,473,730 B1* | 10/2002 | McKeown et al. | 704/9 |
| 6,480,865 B1* | 11/2002 | Lee et al. | 715/523 |
| 6,496,842 B1 | 12/2002 | Lyness | 715/514 |
| 6,523,062 B1 | 2/2003 | Bridgman et al. | 709/203 |
| 6,535,228 B1* | 3/2003 | Bandaru et al. | 715/752 |
| 6,553,410 B2 | 4/2003 | Kikinis | 709/218 |
| 6,581,094 B1 | 6/2003 | Gao | 709/220 |
| 6,598,076 B1 | 7/2003 | Chang et al. | 709/206 |
| 6,629,130 B2* | 9/2003 | Mertama et al. | 709/206 |
| 6,651,108 B2* | 11/2003 | Popp et al. | 719/315 |
| 6,671,853 B1 | 12/2003 | Burkett et al. | 715/513 |
| 6,684,087 B1 | 1/2004 | Yu et al. | 455/556 |
| 6,684,088 B1 | 1/2004 | Halahmi | 455/556 |
| 6,697,825 B1* | 2/2004 | Underwood et al. | 715/530 |
| 6,715,129 B1 | 3/2004 | Hind et al. | 715/513 |
| 6,721,785 B1* | 4/2004 | Raghunandan | 709/206 |
| 6,738,951 B1* | 5/2004 | Weiss et al. | 715/523 |
| 6,763,460 B1 | 7/2004 | Hild et al. | 713/161 |
| 6,775,689 B1* | 8/2004 | Raghunandan | 709/206 |
| 6,795,098 B1* | 9/2004 | Emrani | 715/837 |
| 6,822,663 B2* | 11/2004 | Wang et al. | 715/854 |
| 6,839,741 B1 | 1/2005 | Tsai | 709/217 |
| 6,857,102 B1* | 2/2005 | Bickmore et al. | 715/501.1 |
| 6,904,463 B1* | 6/2005 | Fadel | 709/236 |
| 6,925,597 B2* | 8/2005 | Anwar | 715/513 |
| 6,973,619 B1* | 12/2005 | Hirose et al. | 715/234 |
| 6,988,240 B2* | 1/2006 | Grober et al. | 715/501.1 |
| 7,036,076 B2* | 4/2006 | Anwar | 715/530 |
| 7,039,861 B2* | 5/2006 | Yagi | 715/517 |
| 7,047,033 B2* | 5/2006 | Wyler | 455/552.1 |
| 7,072,984 B1* | 7/2006 | Polonsky et al. | 709/246 |
| 2001/0042078 A1* | 11/2001 | Anwar | 707/500 |
| 2001/0044797 A1* | 11/2001 | Anwar | 707/102 |
| 2002/0054126 A1* | 5/2002 | Gamon | 345/781 |
| 2002/0069223 A1 | 6/2002 | Goodisman et al. | 715/513 |
| 2002/0099829 A1* | 7/2002 | Richards et al. | 709/227 |
| 2002/0138331 A1* | 9/2002 | Hosea et al. | 705/10 |
| 2003/0018815 A1 | 1/2003 | Spicer et al. | 709/246 |
| 2003/0088704 A1* | 5/2003 | Mertama et al. | 709/246 |
| 2005/0122997 A1* | 6/2005 | Bendelac et al. | 370/477 |

OTHER PUBLICATIONS

Wei-Ying Ma, Ilja Bedner, Grace Chang, Allan Kuchinsky, and HongJiang Zhang, *A Framework for Adaptive Content Delivery in Heterogeneous Network Environments. of SPIE Multimedia Computing and Networking 2000*; San Jose, CA, Jan. 2000.

R. Fielding et al., RFC 2616: Hypertext Transfer Protocol—HTTP/1.1 Jun. 1999.

M. Hearst, "TextTiling: Segmenting text into multi-paragraph subtopic passages", *Computational Linguistics*; 23(1) 33-65 (1997).

D. Kristol and L. Montulli RFC 2109: HTTP State Management Mechanism. (1997).

http://searchenginewatch.com/reports/npd.html, NPD search and portal survey.

Jesse. Berst, "Why you're craving an Internet applicance", *ZDNet Anchordesk*, Nov. 11, 1999.

\* cited by examiner

TV.COM

HTTP://WWW.COM/

TV.COM
OTHER VIEWS-
ASIA | EUROPE

TV SITES
MAINPAGE
WORLD
U.S.
WEATHER
BUSINESS
SPORTS
POLITICS
LAW
SCI-TECH
SPACE
HEALTH
ENTERTAINMENT
TRAVEL
CAREER
LOCAL
IN-DEPTH

ADD
INSIDEBARS
TO NETSCAPE 6

EDITIONS:
TV.COM ARTS
TV.COM EUROPE
SET DEFAULT EDITION

BREAKING U.S. OFFICIALS SAY A U.S. ARMY PLANE CRASHED IN GERMANY, KILLING TWO ON BOARD, THE
NEWS ASSOCIATED PRESS REPORTS

MARCH 30, 2001 - UPDATED 11:50, 1969 GMT

U.S. JETS MISSING IN SCOTLAND: FATAL
CRASH REPORTED IN GERMANY

A SEARCH IS UNDER WAY FOR TWO U.S. JETS THAT HAVE
GONE MISSING DURING A TRAINING EXERCISE OVER
SCOTLAND TODAY. THE ASSOCIATED PRESS IS REPORTING
THAT A U.S. ARMY RECONNAISSANCE PLANE CRASHED
NEAR NUREMBURG, GERMANY, KILLING TWO

DEVELOPING STORY

SEARCH

TV.COM / WEATHER    THIS WEEK

FIVE DAY FORECAST FOR 10,000 CITIES

TOP STORIES
• U.S. SUPREME COURT TO REVIEW DEATH PENALITY FOR RETARDED
• PILOTS' STRIKE GROUNDS CONAIR FLIGHTS   IN DEPTH
• HUNDREDS FLEE MACEDONIA FIGHTING   IN DEPTH
• ARSON SUSPECTED IN KENYA SCHOOL FIRE
• U.K. BEGINS MASS ANIMAL BURIAL   IN-DEPTH
• RUSSIA, U.S. ARREST SUSPECTS IN GLOBAL CHILD PORN RING

LIVE
• WATCH NOW: CHILD PORNOGRAPHY BUST NEWS CONFERENCE
REAL OR WINDOWS MEDIA
• TV INTERNATIONAL'S Q&A SOUTH ASIA. WATCH NOW
• WATCH: PRESIDENT BUSH. 12:30 P.M. EST

ON THE NEWS

PAUL VERCAMMENT THE ACADEMY AWARDS

73RD ANNUAL OSCARS

• GLADIATOR ROBERTS, CROWE WIN BIG OSCARS

FIG. 1A
(PRIOR ART)

FIG. 6

THE VOTE CAPPED A MORNING AND EARLY AFTERNOON ⇨ MESSAGE BOARD
FRAUGHT WITH LEGISLATIVE MANEUVERING AND SOME
AMOUNT OF NAIL-BITING AS HAGEL'S CONTROVERSIAL   CAMPAIGN FINANCE REFORM
ATTEMPT TO SUBSTITUTE THE LANGUAGE OF THE
MCCAIN-FEINGOLD BILL WAS SPLIT INTO THREE
SECTIONS, EACH OF WHICH THE STEWARDS OF        ⇨ RESOURCEES
MCCAIN-FEINGOLD SOUGHT TO TABLE WITH A VOTE.
                                               STATUS AND SUMMARY OF THE
62                                             MCCAIN-FEINGOLD REFORMS
                                               HAGEL'S BILL STATUS AND
ONE OF THOSE SECTIONS SURVIVED WHEN AN         SUMMARY (FROM THOMAS)
OVERWHELMING NUMBER OF SENATORS FROM BOTH
PARTIES VOTED FIRST NOT TO TABLE AND THEN APPROVE A HAGEL PROVISION THAT
WOULD SET IN PLACE STRICTER DISCLOSURE REQUIREMENTS FOR THE SOURCE OF
CAMPAIGN CONTRIBUTIONS.

FIG. 10

NEWSPAPER
ON THE WEB

UPDATED MONDAY, MARCH 20, 2001 1:20 PM ET | PERSONALIZE YOUR WEATHER

WELCOME, ADAMBURGER
SIGN UP FOR NEWSLETTER  LOG OUT

SEARCH [PAST 30 DAYS] ⊙
FORM BLOCK
GO TO CANCELED PAGE

BRITAIN DEPLOYS THE ARMY IN FOOT-AND-MOUTH BATTLE
BY ALAN COWELL
NYT UPDATE, 12:45 P.M. ET

IN ITS BATTLE TO CONTAIN FOOT-AND-MOUTH DISEASE, BRITAIN CONTENT ARMY ON MONDAY TO BURN CURRENT UP TO A HALF-MILLION INFECTED AND HEALTHY SHEEP IN A MASS GRAVE... GO TO ARTICLE

CALIFORNIA MAY RAISE ELECTRICITY RATES
BY THE ASSOCIATED PRESS, 8:59 A.M. ET
THE STATE'S CONTENT UP LATOR WILL PROPOSE RAISING ELCONTROLN ON TUESDAY IN THE HOPE OF FORCING CONSERVATION ON POWER-HUNGRY CONAVIGATION OF GAS PIPELINES
• QUESTIONS MAP REGION IT MAY TAKE $4.1 BILLION CHARGE
• PG&E SAYS IT MAY TAKE $4.1 BILLION CHARGE

REBELS ABANDON POSITIONS AS

INSIDE [MORE]
TRAVEL
SAFARI
ADVENTURE
AT A GAME
RESERVE IN
BOTSWANA, THE
GRACEFUL LEOPARD STEALS THE
SHOW. PLUS: DEAL OF THE DAY

READERS' OPINIONS
Q&A
GETTING OUT OF A LEASE?
HEFTYORANGE ASKS: I AM TWO YEARS INTO A FOUR-YEAR LEASE. I FANTASIZE ABOUT BUYING A CAR CAN I GET OUT OF MY LEASE WITH ANOTHER DEALER?

ANSWER THE QUESTION

MARKETS  20 MIN. DELAY
DOW        969869  1993.91 △
NASDAQ     194283  14.13 △
S&P 500    11577   1706

TIGER WOODS WON HIS FIRST PLAYERS CHAMPIONSHIP ON MONDAY. IT WAS HIS SECOND STRAIGHT VICTORY AFTER EARLY SEASON DOUBTS. GO TO ARTICLE

OSCCONTENT BIG NIGHT
ON HOCONTENT SPREAD
OSCAR CATEGORY
ARONAVIGATION

BUSINESS
FLIGHTS CANCELED AS

CLASSIFIEDS
50% OFF
CLICK HERE
AUTOMOBILES
JOB MARKET
REAL ESTATE
ALL CLASSIFIEDS

NEWS
QUICK NEWS
NYT FRONT PAGE
ARTS
BUSINESS
HEALTH
INTERNATIONAL
NATIONAL
NEW YORK REGION
OBITUARIES
POLITICS
SCIENCE
SPORTS
TECHNOLOGY
WEATHER
CORRECTIONS
SPECIAL - TAXES

OPINION
EDITORIALS/OP-ED
READER OPINIONS

FEATURES
AUTOMOBILES
BOOKS
CARTOONS
CROSSWORD/GAMES
JOB MARKET
LIVING

FIG. 11

```
<DOCUMENT>
<IMG/>
<BOLD>
THIS IS A TEXT
BLOCK.
<TABLE>
<TR>
<TD> CELL ONE </TD>
<TD> CELL TWO </TD>
</TR>
</TABLE>
</BOLD>
<SMALL>
THIS IS ANOTHER
TEXT BLOCK.
</SMALL>
<IMG/>
</DOCUMENT>
```
88

```
<DOCUMENT>
<IMG/>
<HR/>
<BOLD>
THIS IS A TEXT
BLOCK.
<TABLE>
<TR>
<TD> CELL ONE </TD>
<TD> CELL TWO </TD>
</TR>
</TABLE>
</BOLD>
<HR/>
<SMALL>
THIS IS ANOTHER
TEXT BLOCK.
</SMALL>
<IMG/>
</DOCUMENT>
```
92

| | |
|---|---|
| 1. TEMPLATE CONTENT | TEMPLATE_CONTENT_BLOCK |
| 2. DEFAULT: | DEFAULT_BLOCK |
| 3. INPUT/FORM RELATED: | FORM_BLOCK |
| 4. GENERIC NAVIGATION: | GENERIC_NAV_BLOCK |
| 5. CONTENT NAVIGATION: | CONTENT_NAV_BLOCK |
| 6. CONTENT: | CONTENT_BLOCK |
| 7. ORGANIZATIONAL NAVIGATION: | ORG_NAV_BLOCK |

REORGANIZING CONTENT OF AN ELECTRONIC DOCUMENT

BACKGROUND

This invention relates to reorganizing content in an electronic document.

Businesses and individuals that publish electronic documents—web pages, email, Microsoft Word documents, rich text files, for example—usually have a target platform in mind. Often the platform is a desktop computer with reasonable storage capacity, memory, bandwidth, and a reasonably large display. Because the electronic documents to be published are designed with this platform in mind, they often contain complex formatting information involving tables, frames, graphics, and navigational aids, all of which define how the document is to be rendered on a conventional computer monitor.

A user may wish to access such a document through a medium for which the document was not originally designed, for example, an Internet-enabled mobile phone, a personal digital assistant (PDA), or a handheld computer. These devices have limited screen size, resolution, and rendering capabilities and are typically unable to render such documents as they were originally designed. Internet-enabled mobile phones, for instance, usually can display only a few lines of text, and either grayscale, thumbnail-sized images or no images at all.

A different medium, which presents similar issues, is speech. People may access electronic documents by telephone, by dialing in to a service that uses speech synthesis to dictate the contents of the documents over the phone. *Voice Becoming the 'most powerful tool' on the Web*, Barbara Rose, Chicago Tribune, Jan. 29, 2001. A dictated document does not express the complex layout information embedded in the original document.

Many Internet-enabled mobile devices restrict the maximum size of a document that they can render. For instance, most Internet-enabled phones that comply with the WAP (Wireless Application Protocol) standard support documents no larger than 2000 bytes. Even for those mobile devices (e.g., Pocket PC's and palm-based computers) that do not impose a strict size limit on documents, large source documents must be broken into smaller parts because transmitting long documents at once over slow wireless networks can try the patience of users. (For a similar reason, large documents are broken into smaller parts for the purposes of dictation.)

For example, the original hypertext markup language (HTML) of the web page shown in FIG. 1A can be broken into nine subdocuments so that the page can be displayed in subdocuments on the screen of a phone as shown in FIG. 1B. The top of the screen on the phone shows "(2/9)", indicating that the phone is displaying the second of nine subdocuments that made up the original HTML document.

SUMMARY

Among other advantages of the invention, original documents can be reconstructed to enable a user of a low-capability device to view (or listen to) and use the documents effectively.

In general, in one aspect, the invention features a method that includes (a) receiving an electronic document represented by serial data that contains content of the document and defines an order in which respective portions of the content are to be performed, (b) analyzing the serial data of the electronic document, and (c) generating reorganization information for use in delivering the portions of the content, the reorganization information enabling performance in an order different from the order defined by the serial data.

Implementations of the invention may include one or more of the following features. The serial data representing the electronic document is expressed in a hypertext markup language such as HTML, PDF, postscript, SGML, Powerpoint, rich text, or unformatted text. In other examples, the serial data representing the electronic document is expressed in an electronic mail format that includes a header and a main body and the analyzing process includes determining the start of the main body. The content of the document includes at least one of the following: text, images, tables, frames, and headings. The order in which the respective portions of the content are to be performed may include a two-dimensional layout.

The reorganization information includes an identification of a relative importance of the respective portions of the content. The information includes an identification of a main block of text. The analyzing process includes finding an annotation inserted in the electronic document as a marker of the location of the main block of text. The reorganization information associates with each of the portions of the content a revised order for presentation. The reorganization information includes a hyperlink to be displayed near the beginning of the document, the hyperlink pointing to a portion of the content that appears later in the original order. The reorganization information causes an automatic redirection from the first portion of the content to a later portion of the content when the document is opened for performance. The hyperlink is included only if the location of the hyperlink in the document is separated by at least a predetermined distance from the location to which it points.

Performance of the portions of the content comprises presenting the portions on a display for viewing. The different order of performance enabled by the reorganization information is adapted for a display that has a more restricted performance capability than does the performance capability of the display for which the document was originally designed. The more restricted display is part of a mobile phone or personal digital assistant, and the display for which the document was originally designed comprises a desktop computer monitor. In some implementations, performance of the portions of the content comprises presenting the portions by speech synthesis.

The analysis includes identifying one of the portions as containing central content of the document. The generation of the reorganization information includes inserting a link from near the beginning of the first portion of the content to the beginning of the central content portion. The generation includes moving the central content portion to near the beginning of the document. The generation includes altering the document so that the central content portion appears first when the document is performed.

The analysis includes identifying portions of the document that should not be separated in generating the reorganization information. The portions that should not be separated include at least one of the following pairs: heading and text, image and caption, or paragraph and related paragraph. The analysis includes identifying portions of the document that should not be moved relative to other portions of the document. The analysis includes identifying portions of the document that should be moved relative to other portions in generating the reorganization information. The portions that should be moved comprise images or tables. The analysis includes identifying regions according to functions. The functions include navigation and content. The analysis includes converting the document to a tree format. The analysis includes blocking major regions of the document. The analyzing includes counting characters of text.

In general, in another aspect, the invention features a method comprising (a) at a server, receiving a request from a remote device for a portion of a document represented by serial data that contains content of the document and defines an order in which respective portions of the content are to be performed, in response to the request, and (b) returning at least one and fewer than all of the portions of the content using reorganization information that enables performance of the portions in an order different from the order defined by the serial data. Implementations of the invention include receiving other requests for portions of the content of the document different portions, and in response to the requests, returning other portions of the content using the reorganization information.

In general, in another aspect, the invention features a data structure stored on a medium and capable of configuring a machine to respond to requests for portions of a document that is represented by serial data that contains content of the document and defines an order in which respective portions of the content are to be performed, the data structure comprising reorganization information that enables performance of the portions in an order different from the order defined by the serial data. In implementations of the invention, the data structure may include the content, the data being expressed as a modified version of an original data structure that expressed the document. The modified version may include annotations.

In general, in another aspect, the invention features apparatus corresponding to the methods.

Other advantages and features will become apparent from the following description and from the claims.

DESCRIPTION (FIGS. 1A, 6, 10, and 11 show web pages or portions of web pages.

FIGS. 1B, 7A, 7B, 7C, 8A, 8B, and 9 show mobile phone displays.

FIGS. 2, 3, 4, 5, and 12 show a block diagram.

FIGS. 13, 14, 15, and 16 show HTML-to-tree and tree-to-tree conversions.)

One difference between the capabilities of a desktop computer and of "non-traditional" media such as the phone is the display dimensionality. A desktop monitor supports a two-dimensional layout of information, whereas a phone's display or a sequence of dictated words appears "ticker-style"—as essentially a linear flow of information. (While technically the phone's display is two-dimensional, the amount of information that can be displayed is so small as to produce effectively a ticker-style impression.)

An automatic real-time content transformation system can transform a document meant for two-dimensional display into a ticker-style, one-dimensional stream of data, without producing a document that is inconvenient to read.

Figure 2:
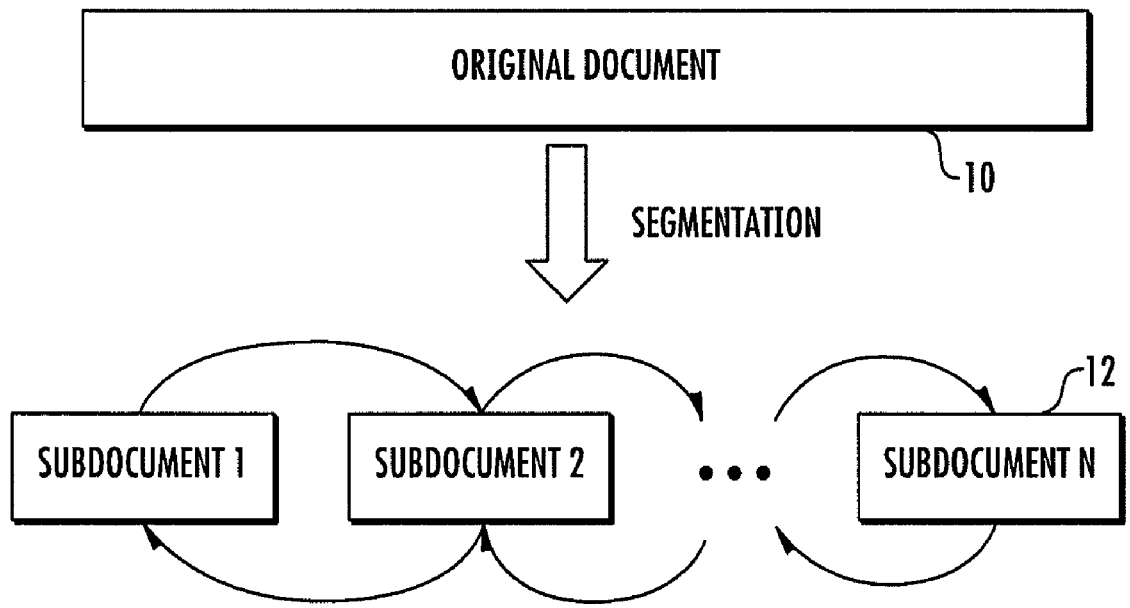

As shown in FIG. 2, part of the functionality of an automatic real-time content transformation system is to segment a source document 10 into smaller interrelated subdocuments 12, each of a size small enough to be processed by a target mobile device. More information about one way to perform the segmentation is set forth in U.S. patent application Ser. No. 09/745,289, filed Dec. 20, 2000, and incorporated by reference.

A document targeted for display on a portable device is written in a markup language accepted by the device—sometimes HTML, but often another less commonly-used markup language such as WML, HDML, cHTML, or a proprietary language. Because different wireless data devices have different capabilities, a content creator writes a separate version not only for each target markup language but also for each target device. For instance, a mobile phone equipped with a Nokia microbrowser renders WML content differently from a phone equipped with an OpenWave microbrowser. Also, the content provider needs to understand how to identify the capabilities of the client device and how to create a document optimally formatted for that client.

Figure 3:
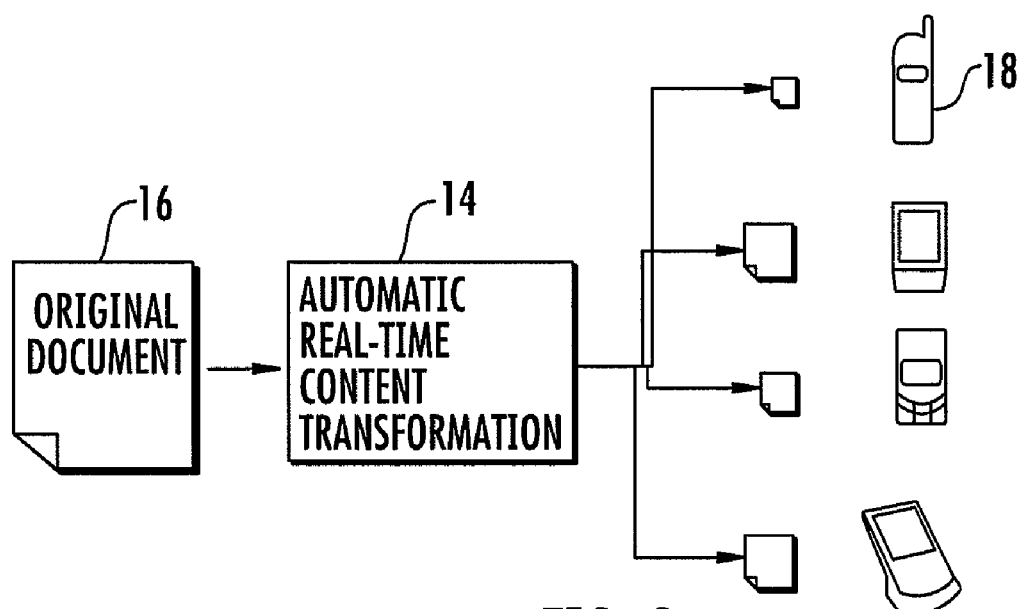

As shown in FIG. 3, automatic, real-time content transformation 14 retargets a document 16 for optimal display on a target device 18.

Figure 4:
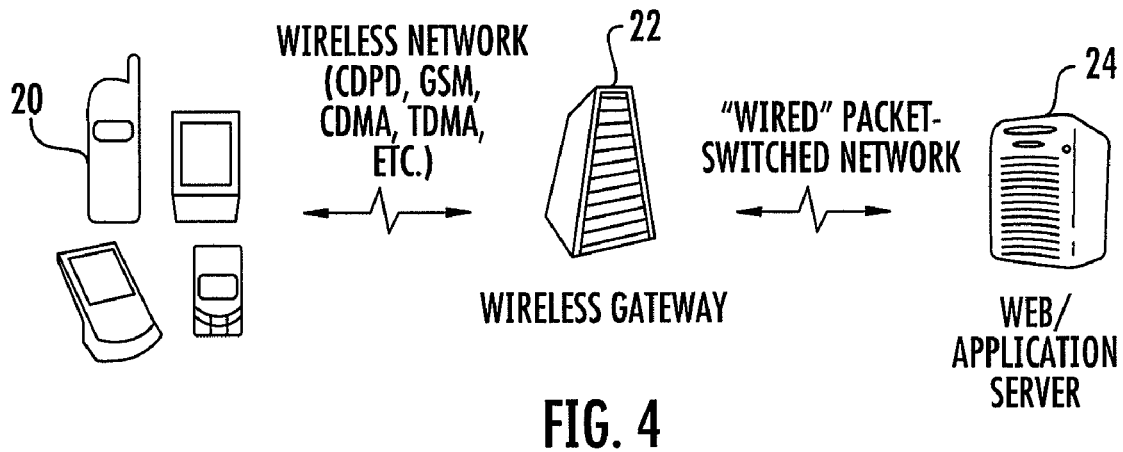

As shown in FIG. 4, Internet-enabled wireless devices 20 communicate with the Internet through a gateway 22, which mediates between the wired and wireless worlds. When, for instance, the user of an Internet-enabled phone requests a web page, that request is transmitted to the wireless gateway, which in turn forwards the request to the origin server 24 on the Internet responsible (according to the DNS protocol) for the requested document. An automatic, real-time content transformation system can be deployed at various locations in the client-origin server channel, including the wireless gateway and the origin server.

Figure 5:
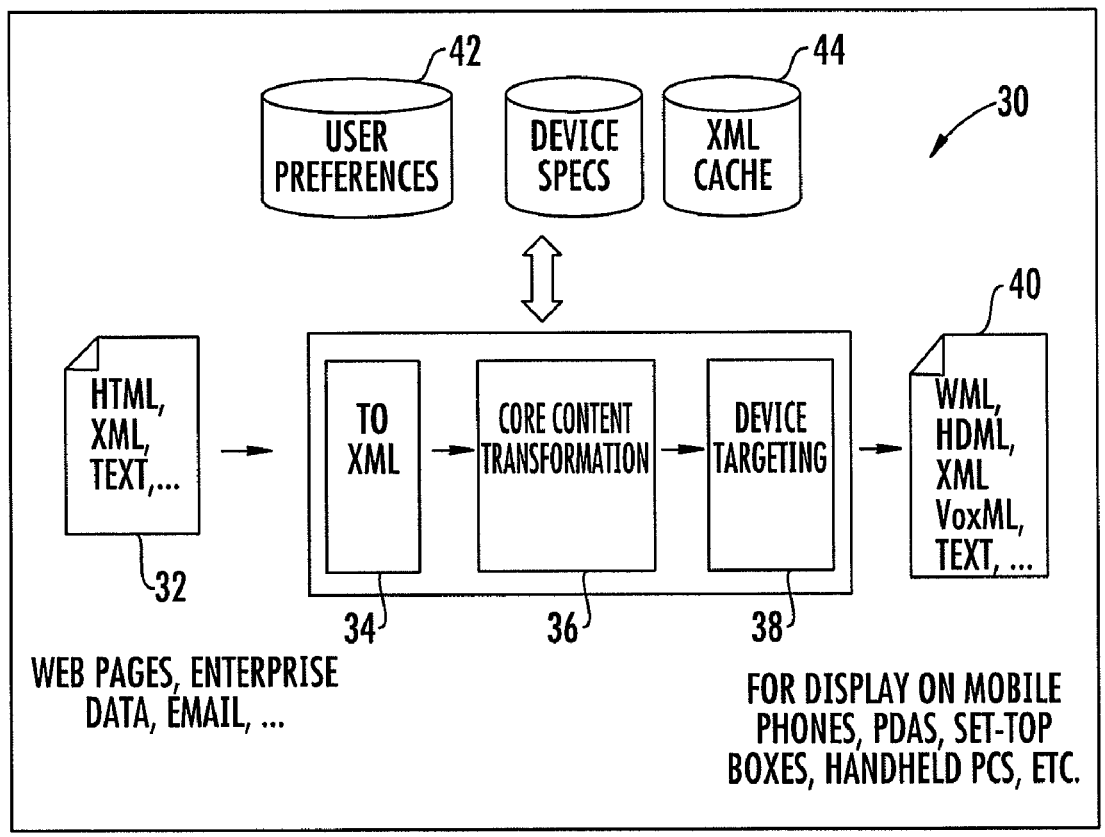

As shown in FIG. 5, an automatic content transformation process 30 begins with a source document 32, for example, an HTML file, email, PDF, postscript, text, or XML file, among other formats, which is first processed by an adaptor 34 that converts the input to an internal representation (XML is one convenient format).

After the conversion is complete, the resulting intermediate document is sent to a sequence of content transformation modules 36, 38 to optimize it for display on the target device. The document is then reformatted to the markup language 40 appropriate for the target device and transmitted to that device. User preferences 42 and document caching 44 may be included in the system.

The resulting document is adapted to the type of client device requesting the document, so that, for example, a document intended for viewing on a PDA will be processed differently from one intended for use on an Internet-enabled phone. The transformation modules adapt not only to the type of device (handheld computer, PDA, phone, etc.) but also to the specific model of the device and to the wireless service provider. A Palm VII with the Palm.net wireless service has different behavior from a Handspring Visor with an Omnisky wireless modem, for instance, and a Samsung SCH8500 phone with Sprint PCS wireless web service has different characteristics than a Motorola StarTAC with AT&T wireless service.

Some simple examples of content transformation follow:

Abbreviate dates such as "November 12, 1987" into a shorter form, like "11/12/87".

Replace phrases with common acronyms (so that "United States" becomes "U.S.").

Partition a large document into smaller parts, each small enough to be digestible by the target device.

Shrink the size of each image to fit on the target device. Convert color images to black and white, for those devices that cannot render color images.

Reorganize the document so it can more conveniently be accessed by someone using a non-traditional medium.

Figure 6:
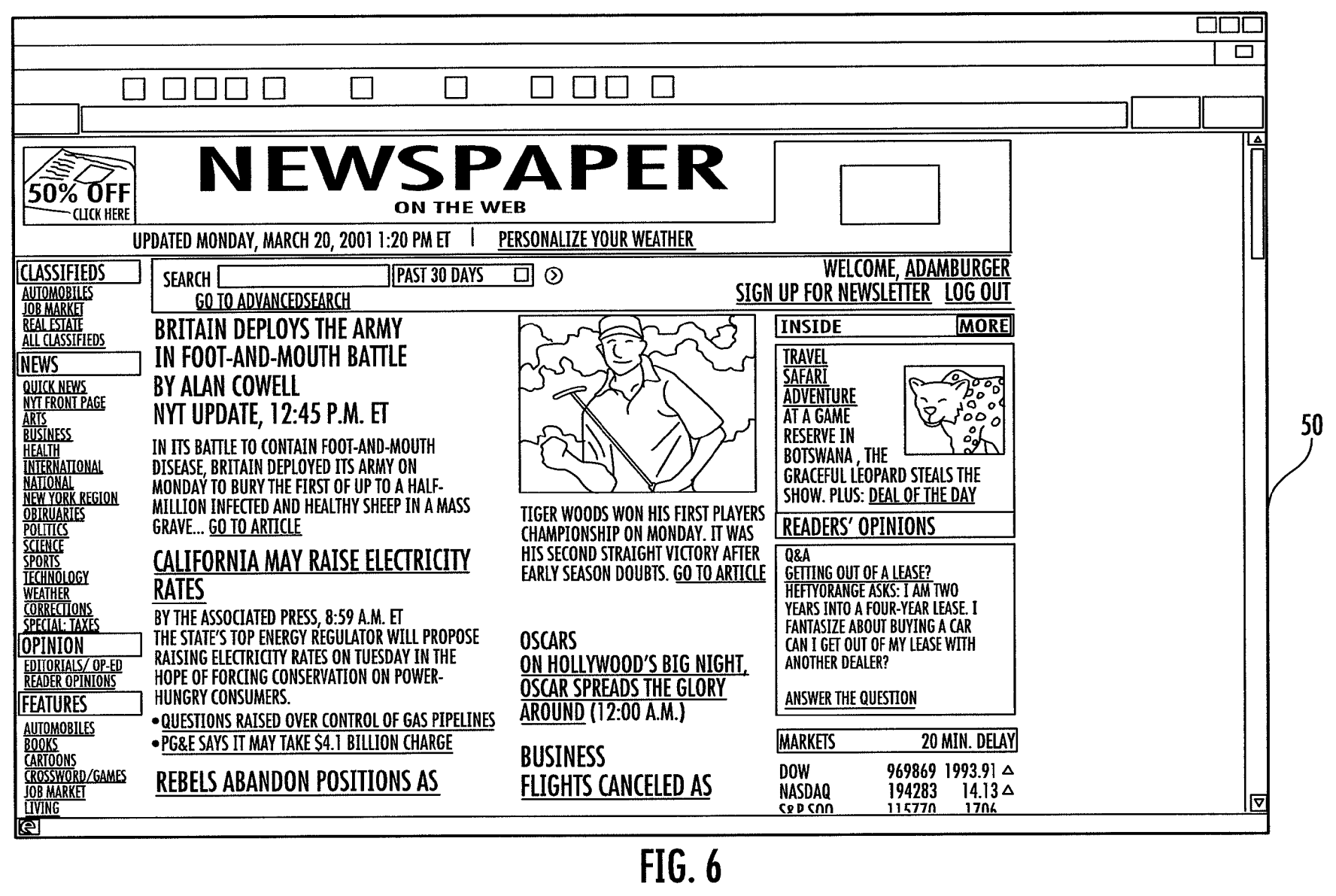

With respect to the final item of the list, FIG. 6 shows a typical commercial web page 50 having a complex, two-dimensional layout. Many people viewing this document on a traditional desktop computer display will first notice the story beginning "Britain Deploys." However, this story does not appear at the beginning of the source HTML document that underlies the displayed version. Rather, a number of advertisements, banners, forms, and navigation links precede the story in the source HTML, including A New York Times banner, the date and time, a link to "personalize your weather", a search form, and a set of navigation links, starting with "Classifieds," which are displayed on the left-hand side of the screen.

Figure 7C:
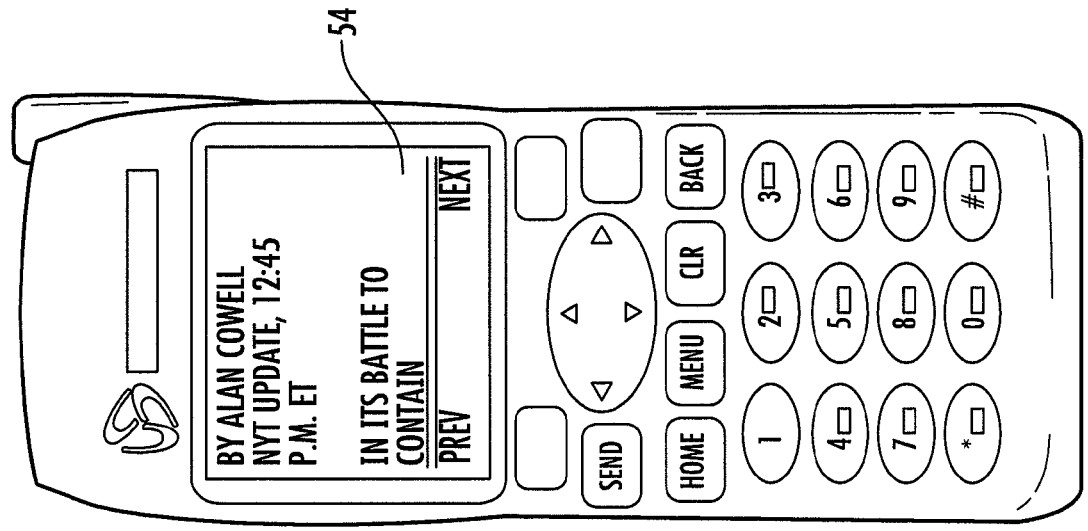
Figure 7B:
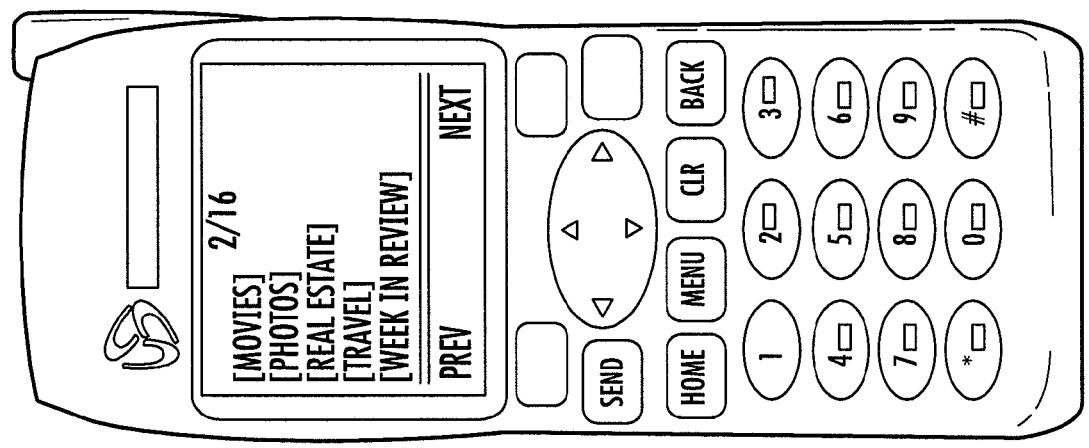
Figure 7A:
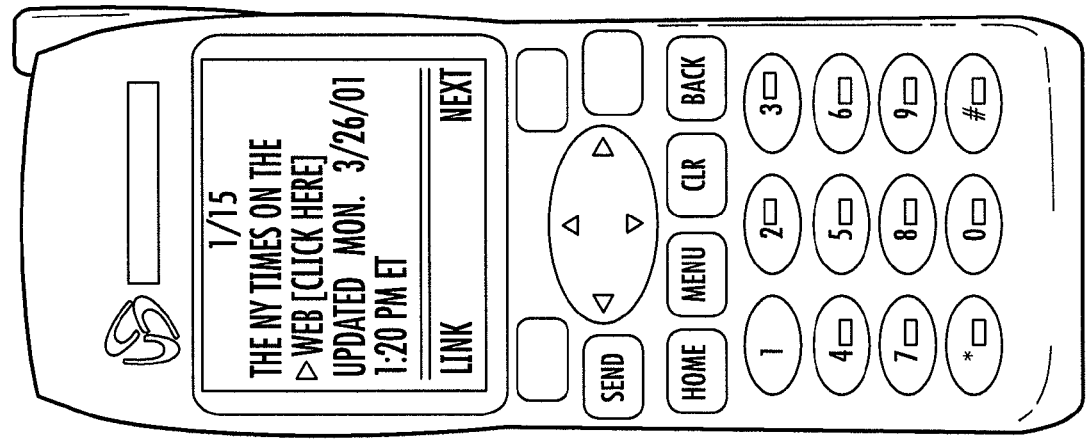

If the source HTML document were transmitted in its original order to a small-screen device, the user would have to navigate through a considerable amount of secondary content before reaching the breaking story. As shown in FIGS. 7A, 7B, and 7C, the main story, starting with "In its battle to contain...", would not appear until the middle 54 of the third sub-document (in FIG. 7C).

Users of small-screen devices typically prefer not to have to wade through information of secondary importance before reaching the information of interest to them.

Figures 8A, 8B:
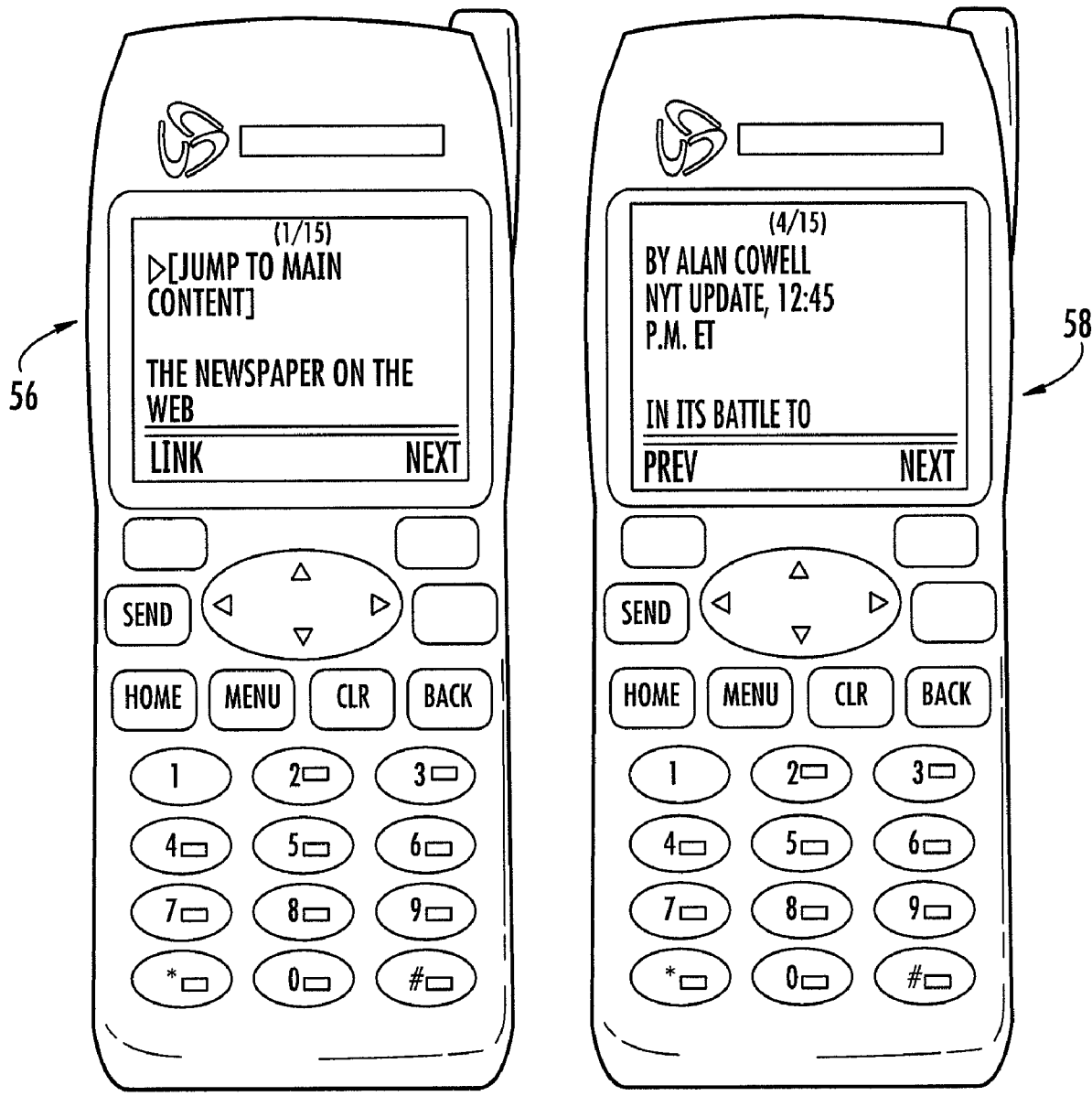

As shown in FIGS. 8A and 8B, one strategy for enabling a user to get to the information of interest quickly is to insert a link 56, at the beginning of the first subdocument, that links directly to the main content 58 that begins at subdocument 4 of 15).

Figure 9:
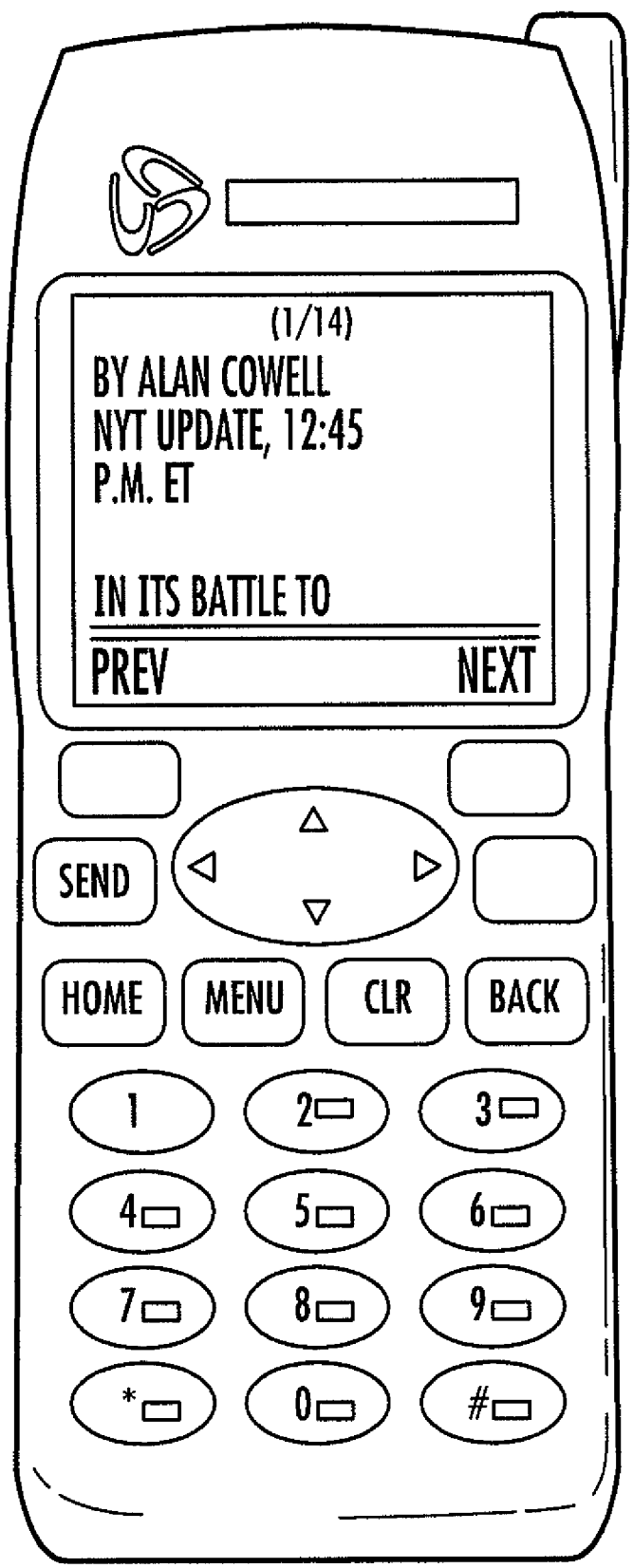

Another strategy, shown in FIG. 9, is to reorder the original document, so that the main content appears first (in the source for the first subdocument)

A third approach is to provide an internal annotation to the subdocument containing the beginning of the main content and cause the display device to start directly at this subdocument when the user requests the document.

As shown in FIG. 10, another difficulty faced by those viewing documents using non-traditional media occurs when the original document includes, for example, a table 60 next to a body of related text 62. Such interrupting blocks can be identified and moved so they appear after, rather than in the midst of, the adjacent text. After rearrangement, the content becomes more accessible on linearly-formatted media like small-screen handsets.

In some implementations, one or more of the following operations (which can be thought of as subroutines) are applied to an input document (such as a hypertext document in HTML, XML, text, Microsoft Word, or another format). The output is a document whose content has been altered to allow for easier access through non-traditional media.

Functions to be Performed by a Restructuring Algorithm

Annotate the Beginning of the Main Content

The annotation is a single node inserted into a tree representation of the document, at the place where the system determines that the central content of the document begins There are two methods for determining where the main content begins:

1. Use, if present, a document author's annotation.
2. Calculate the location of the beginning of the main content using the algorithm described below.

Using this information, any of the three approaches mentioned earlier can be implemented: inserting a link from the beginning of the first subdocument to the beginning of the main content, reordering the document so the main content moves to the beginning of the first subdocument, or directing a user immediately to the beginning of the main content.

Annotate the Scope (Start and End) of Atomic Groups in the Document

By "atomic group" is meant a group of sibling nodes within a document tree that should not be separated. For instance: (a) a headline should not be separated from the subsequent story, (b) a picture should not be separated from an accompanying caption, and a sequence of paragraphs comprising a body of text should not be separated from one another.

The purpose of identifying and annotating "atomic" blocks within the HTML code is to ensure that if content in a document is rearranged, the rearrangement does not violate the coherence of the content of the document.

Classify Subtrees Within the Document Tree as Movable or not

Certain subtrees within a document tree—tables, table rows, table cells, and image maps—can be migrated within the document without disrupting (often improving, in fact) the narrative flow of the document. Elements that are not movable include paragraphs within a larger text block and images adjacent to a caption. Moving them would disrupt the narrative flow of the document.

Move Elements That Interrupt a Body of Text to Locations Outside the Text Body

As described earlier, punctuating a body of text with a related picture or table is a stylistic device often used by document authors and publishers. But such interruptions are often disruptive when the document must be conveyed in a linear manner. Therefore, these types of "accompanying" elements, when marked as movable, are demoted to the end of the text block.

Regions in the Document are Classified According to Function

Regions in the documents are classified into one of a number of categories, listed in Table 1.

TABLE 1

List of categories for nodes within a document tree.

| | |
|---|---|
| Template content | Narrative content that is generic or not related to the rest of the document (e.g. the copyright information, or information related to the revision history of the document.) |
| Default | The default or "catchall" category |
| Input/form-related | Elements related to transactions (forms, buttons, input text blocks, etc.) |
| Generic Navigation | A set of links with short labels whose purpose is to provide easy access to other documents. |
| Content Navigation | Navigational aids (links) which also contain information. |
| Content | Narrative content which appears to be unique to the document |
| Organizational Navigation | A set of intra-document links which point to parts of the current document as an aid in navigating the document. |

FIG. 11 shows a web page annotated with some of these categories, for illustration.

Example Restructuring Algorithm

Figure 12:
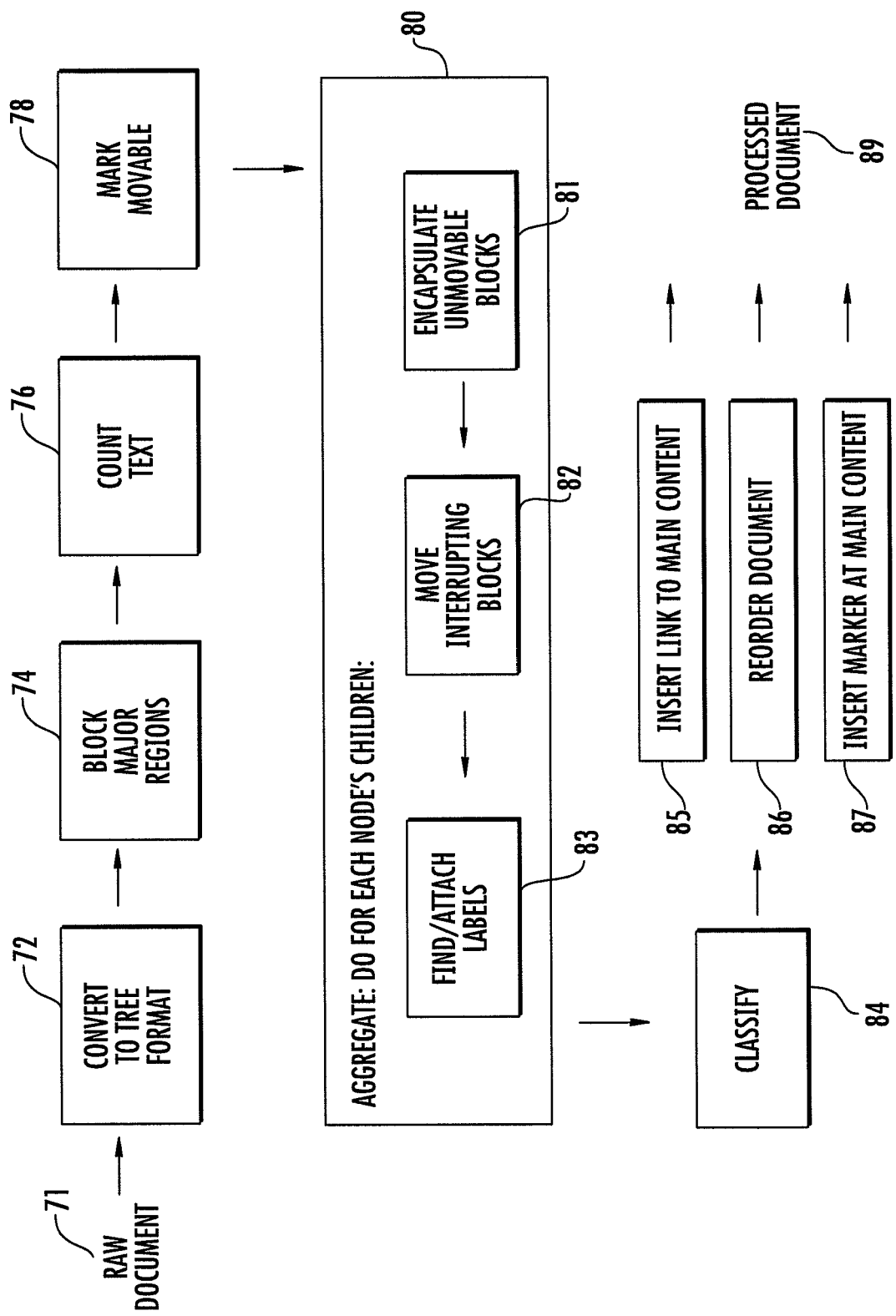

Referring to FIG. 12, a step-by-step process 70 for content rearrangement includes the following steps.

Convert to Tree Format

Figure 13:
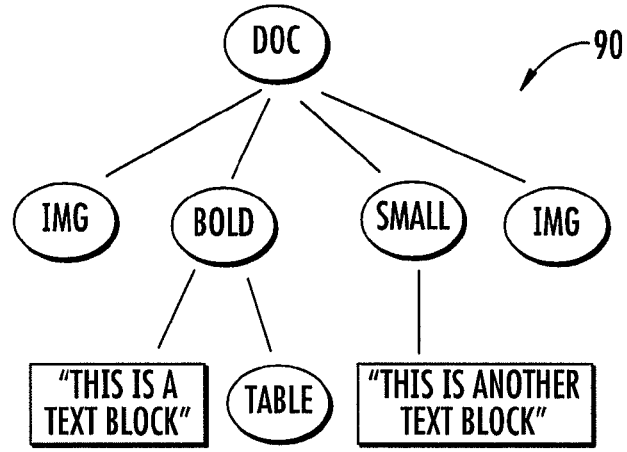

The raw document 71, in an arbitrary format, is converted 72 to a common internal tree-based representation. The representation may be described using an emerging standard called the DOM (Document Object Model) markup language, Document Object Model (DOM) Level 3 Core Specification, Version 1.0, but other formats are possible. For documents in some markup languages there exist publicly—available tools for performing this conversion, see The Tidy Project, but for documents in other markup languages, the conversion routine must be created de novo. FIG. 13 shows an example of a simple HTML source document 88 and a corresponding tree-based representation (with the subtree underneath the table node omitted for clarity) 90.

Block Major Regions

In the interest of clarity, long documents often include (implicitly or explicitly) information that demarcates major regions from one another. HTML authors, for instance, often use <hr> tags to separate regions; this tag typically appears as a thin line extending the entire horizontal span of the screen. HTML authors also sometimes use the <frame> tag to distinguish separate regions. In common word-processing formats such as Microsoft Word, the beginning of a new chapter or section serves to distinguish major regions. In presentation software such as Microsoft Powerpoint, separate slides represent different regions. Referring again to FIG. 12, for each major region explicitly demarcated in some way in the original document, the "Block major regions" component 74 identifies the region and inserts a BLOCK node in the document tree. The BLOCK node encapsulates the region, which exists as a subtree underneath the BLOCK node. Later processing will make use of this additional structural information in the document tree.

Figure 14:
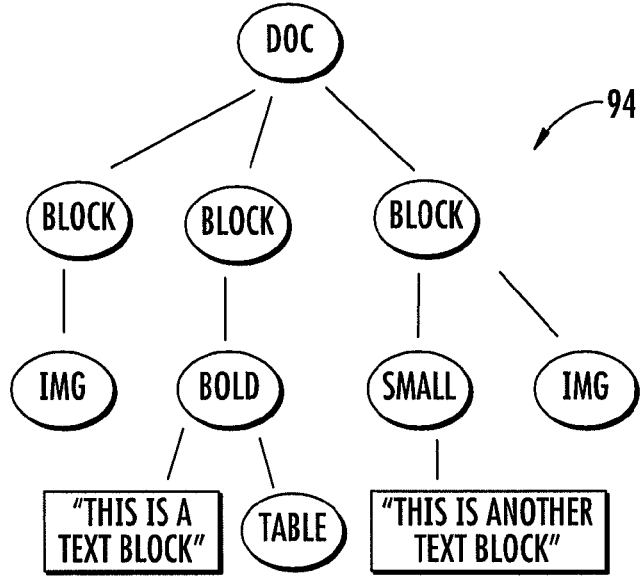

FIG. 14 shows an example in which an HTML source document 92 having its first two regions demarcated by <hr> tags is represented by three Blocks in the tree representation 94.

Count Text

The count text step 76 counts the number of text characters within (and underneath) each node in the document tree. Although a document tree such as the one in FIG. 14 contains many characters, only those characters that will be displayed by a rendering agent (a web browser, for instance) are counted in this step. We'll subsequently refer to these text block characters as printable characters, distinguishing them from characters comprising element names ("img" and "bold" and "table", for instance).

Having counted printable characters, this step annotates each node with the number of printable characters within the subtree rooted at that node. We refer to this value as the text size of the node.

Mark Movable

The mark movable step 78 identifies movable elements—elements that can be moved within the tree. The actual moving of nodes occurs later, but we note that nodes typically will only be moved within their sibling set: the set of nodes which share the same parent in the tree. That is, a node generally is not promoted or demoted to a different level in the document tree.

Tables, table rows, table cells, image maps, and blocks generated from Block Major Regions are all movable. Individual paragraphs adjacent to other paragraphs are not movable, because moving one without the other could disrupt the correct ordering of text.

Aggregate

The aggregate step 80 encapsulates consecutive nodes in the tree that are acting as a functional unit. In this sense, it performs a function similar to Block Major Regions, except that the aggregate step operates at a finer level of granularity in the document tree.

This step achieves two main goals:

1. Protect groups of nodes within a document that are likely to have a similar purpose and should be kept together—groups of nodes that should not be rearranged, such as a sequence of paragraphs comprising a body of text.
2. Identify small nodes (typically but not exclusively textual) that act as labels for subsequent larger nodes, and protect against the later separation and rearrangement of these label/body pairs.

The aggregate step may itself be broken into three subroutines 81, 82, 83. Aggregate performs these three steps in sequence on each node in the document tree which has children.

Encapsulate Unmovable Blocks

The encapsulate unmovable blocks subroutine 81 establishes the following invariant in the document tree, maintained through the rest of the processing steps: If one of a node's children is movable, then all the children are movable.

To establish this invariant, this step finds contiguous sequences of unmovable nodes that are movable as a block, and encapsulates them inside a BLOCK, which is marked as movable.

Figures 15, 16:
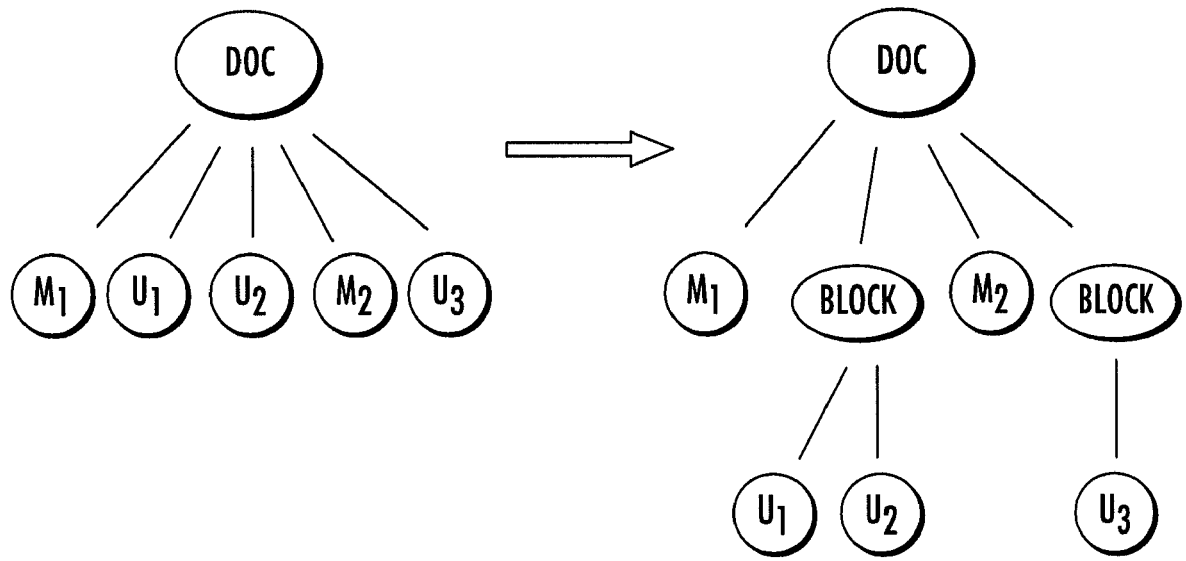

Encapsulate Unmovable (Node n)
1. If n is not movable, then return
2. If none or all children of n are movable, then return n
3. Encapsulate (put underneath a BLOCK node) each contiguous sequence of unmovable child nodes of n FIG. 15 provides an example of a tree before 96 and after 98 the packaging of unmovable nodes.

Move Interrupting Blocks

As previously explained, an "interrupting block" is a set of elements that "interrupt" a body of textual content to provide an illustrative picture, supporting information, or in some cases a survey requesting feedback on the text. If not moved out of the way (by demoting them so they appear after, rather than during, the body of text), these interrupting blocks would disrupt the flow of the text within a linear presentation of the document.

A simple test for identifying interrupting blocks in an HTML document is to look for tables with the attribute align set to left or right. When found, the table is demoted so it appears after the last of its siblings that contains the adjacent text.

By performing this move interrupting blocks step on a node n's children immediately before the label attachment 83 of n's children, label attachment becomes much more accurate and easy to implement. Because labels and their bodies are determined by sizes of siblings, moving blocks that are to be moved anyway creates a single homogenous body instead of being separated across several disjoint? regions.

Find/Attach Labels

The find/attach labels subroutine 83 identifies nodes that act as labels for their successors. For instance, a headline acts as a label for the following story, and the two should not be segregated. The algorithm to accomplish this, shown below, begins by calculating a threshold value for each child of a node. That value is the geometric mean of the smallest text size and largest text size among the children. All siblings whose text size exceeds this threshold are labeled as LARGE, and the rest as small. The notion of LARGE and SMALL are thus relative to a set of siblings.

ClassifySiblingsByRelativeSize(Node n)
1. Classify each child of n as SMALL or LARGE as follows:
   a. Set min=minimum text size of all children of n
   b. Set max=maximum text size of all children of n
   c. Do for all children c of n:
     I. Set x=text size of c
     II. If $x < (mm*max)^{1/2}$ then classify c as SMALL else classify c as LARGE
2. Encapsulate each consecutive sequence of SMALL children of n within a BLOCK, labeled as SMALL
3. Encapsulate each consecutive sequence of LARGE children of n within a BLOCK, labeled as LARGE Steps 2 and 3 encapsulate similarly labeled siblings. Often this step captures many consecutive subtrees: for instance, a headline followed by a byline followed by a brief synopsis of the upcoming story. Connecting similarly labeled blocks ensures that the entire label and the entire block move as a unit, avoiding a separation of related blocks.

After these three steps, the following algorithm is used to attach labels to bodies.

AttachLabels(Node n)
1. Do for each consecutive pair of (SMALL, LARGE) siblings among the children of n:
   a. Let |x|=text size of node x
   b. Let |y|=text size of node y
   c. If |x|<|y|/3, then encapsulate (x,y) within a BLOCK Step 1c is a heuristic (and the value ⅓ is a suggested value, which might not be optimal for certain classes of documents) designed to identify when a subtree is acting as a label to a subsequent block. The labeling strategy here is conservative, because the ramifications of mistakenly identifying a subtree as a label are small (merely that the subtree will never be separated from the subsequent block).

Classify

The classify step 84 classifies each node in the document tree into one of a fixed number of categories. The following table reiterates the list of the categories provided earlier and associates each category with a label, referred to in subsequent algorithms.

| | |
|---|---|
| Template Content | TEMPLATE_CONTENT_BLOCK |
| Default: | DEFAULT_BLOCK |
| Input/Form Related: | FORM_BLOCK |
| Generic Navigation: | GENERIC_NAV_BLOCK |
| Content Navigation: | CONTENT_NAV_BLOCK |
| Content: | CONTENT_BLOCK |
| Organizational navigation: | ORG_NAV_BLOCK |

The following algorithm contains an example classification procedure, designed for HTML documents. The return value is an integer priority, corresponding to the table of categories above.

```
int classify(Node n) {
// A list of HTML tags which are input/form-related. Other markup
// languages will have different tags.
1. formElementSet =
{FORM, INPUT,BUTTON,TEXT_AREA SELECT,OPTION,
OPTGROUP,FIELDSET,LABEL};
2. if (formElementSet.contains(n)) return FORM_BLOCK;
// There is no printable text within this subtree
3. if(n.textSize == 0) return DEFAULT_BLOCK;
// Among all characters appearing in this subtree, what fraction
// appears inside links and forms?
4. double inLinkRatio =
(n.textSizeInLinks + n.textSizeInForms) / n.textSize;
// The ratio of printable characters to links within this subtree
5. double textToLinkRatio = n.textSize / n.nLinks;
// This subtree contains links, a high percentage of characters
// inside links and forms, and a high percentage of same-site links.
// Note: n.nInDocLinks = # of links within the subtree rooted
// at node n which point elsewhere in the same site.
6. if (n.nLinks > 0 &&
   (inLinkRatio > 1/2 && (n.nInDocLinks / n.nLinks > 2/3)))
   return ORG_NAV_BLOCK;
// Test for content / template content
7. if (inLinkRatio < 1/2 && (n.nLinks == 0 || textToLinkRatio > 50))
if (n contains the word "copyright") return
TEMPLATE_CONTENT_BLOCK; return CONTENT_BLOCK;
}
// There are no links within this subtree, or the ratio of text
```

-continued

```
// to links is very high
8. if (n.nLinks == 0 || textToLinkRatio > 30)
return CONTENT_NAV_BLOCK;
// base case
9. return GENERIC_NAV_BLOCK;
}
```

Step 7 contains an overly simply heuristic—check for the word "copyright"—for determining whether a content block is actually template content. In practice, a more reliable test for template content would involve applying a text classification procedure, such as the Naïve Bayes classifier, to the task of distinguishing the two categories, Some Naïve Bayes classifier reference. Applying a machine-learning technique like Naïve Bayes requires a large collection of text blocks, each annotated with the correct label (CONTENT or TEMPLATE CONTENT), so the algorithm can "learn" to distinguish the two categories.

In practice, the above heuristic works well for most HTML documents, especially those from websites with large, complicated pages that need to be distilled for lightweight devices. The algorithm above is also independent of the language or words that are being used. In addition to being portable to other languages, this also technique is also very fast compared to one that would need to do content analysis.

Node Comparison Routine

We now arrive at the final step of the document rearrangement process. Before describing the individual steps (insert link to main content 85, reorder document 86, and insert marker at main content 87), we introduce a node-comparison routine shared among these steps.

The comparison function places an ordering on the nodes by their classification. As one would expect, the CONTENT classification has a high priority, though not as high as ORG_NAV. Organizational navigational content is by definition a block that must precede the content because the hyperlinks within it point to places further down the tree. For instance, the links under "In this story:" on CNN's story pages, or the links in the left column on http://espn.go.com/jobs act as a table of contents to the main content and could be quite useful to a user of a lightweight device.

In cases where two nodes are both labeled as CONTENT blocks, the "block density" is used to break the tie. To define block density, we first define the Squared Block Size (SBS):

For all terminal blocks nodes:
  if (node is CONTENT) SBS=textsize$^2$
  Else SBS=0
For all other nodes:
  SBS=Sum of all childrens' SBS values Block nodes are those that are elements that are considered block elements by the HTML specification. These elements can be thought of as not being able to occur on the same line with any other element. Examples are P, CENTER, DIV, BLOCKQUOTE, TD, etc. A terminal block is one that has no blocks underneath it.

The block density can be defined as:

D(a)=SBS of a/(# of terminal movable blocks under a)

More specifically, the "density" is the average SBS value for the terminal movable blocks under it. If there are two subtrees a and b, each containing 100 characters, but subtree a's characters all appear within a single node whereas b's characters are interspersed among many nodes, then subtree a is denser. The intuition here is that denser nodes are likely more descriptive (because their blocks are longer).

The comparison algorithm is therefore:
CompareSiblings (Node a, Node b)
1. If (type of a != type of b) then return node of higher priority
2. Return whichever node has the higher D-value We now describe the three final steps in the reorganization process.

Insert Link to Main Content 85

The following algorithm locates the "main" CONTENT block in the document, and inserts a link from the beginning of the document to this block.

InsertLink

---

1. Set n = node at root of document tree
2. while (n is not a terminal cell AND n.textsize > K)
3.   if n has CONTENT block descendents then
4.     Set n = child CONTENT block with the highest D-value
5.   else break
6.   // iterate back up the tree
7. while (n's previous sibling == LABEL OR n has no previous sibling)
8.   n = n's parent
9. If there are more than M printable characters between the start of the document and n, then insert a link from top of document to node n

---

In other words, walk down the tree while the nodes have at least K printable characters until a terminal cell is reached; at each level of the tree traversing the "best" content block. (The value of K is an adjustable parameter. In one implementation, K was set to 400.) Once this is found, make sure that a label would not appear right before the block in an in-order traversal (since that label would likely be part of the main content).

The value of M dictates how far from the beginning of the document the detected main content must reside before the algorithm will bother to insert a "jump to main content" link at the top of the first subdocument. It would make little sense, for example, to insert a "jump to main content" link when the main content is only three lines from the start of the transformed document.

Call InsertLink, but replace 11 with code to tell the system to start at n when the user accesses the document.

Reorder

The reorder step 86 recursively sorts the children of each node in the document tree.

Before explaining the sorting procedure, we require a definition:

A node in a document tree is protected if its children are not movable, or if the subtree rooted at that node contains fewer than some predetermined number of characters N, or if the node was marked a label or body of a label earlier.

"Protected" nodes are nodes into which the recursive sorting algorithm does not descend. In one implementation, N was set to 400.

Recall that the Encapsulate Unmovable Blocks step has previously ensured that either all or none of a node's children are movable.

The end result of the sorting procedure is a transformed tree in which the following holds: if a set of sibling nodes is movable, these nodes are ordered (from left to right) by decreasing likelihood of containing content.

FIG. 17 shows a simple example of the sorting process applied to three children of a "document" node.

The sorting procedure is straightforward. Each node in the tree already has been assigned a category (in the Classify step). Nodes are sorted according to the ranking of categories given in FIG. 15. If the two nodes belong to the same category, the sorting algorithm breaks the tie by preferring the node that contains a "denser" presentation of information.

Building a recursive node sorting algorithm on top of this node-comparison routine is straightforward:

RecursiveSort
1. Set n=root node of of document tree
2. If n is not protected, then
   a. Sort children of n with CompareSiblings algorithm
   b. Call RecursiveSort on each child of n
3. Return n Other implementations are within the scope of the following claims.

The above algorithms calculate the location of the beginning of the main content in a hypertext document. In some cases, this work isn't required. For instance, the author of a hypertext document may insert an annotation into the document to indicate where the main content begins.

Email

The above discussion relates generically to hypertext documents, such as web pages and corporate intranet documents. Similar principles can be applied to hypertext-encoded email messages. In addition, email documents, both hypertext-encoded and non-hypertext encoded have some particular characteristics, not found in general hypertext documents, that an automatic content rearrangement system can exploit for the purpose of reorganization. These characteristics present the opportunity for document reordering and prioritization for purposes of presentation.

The following figure is an example of a rather "generic" email.

---

Return-Path: bovik@eizel.com
Received: from mail.eizel.com (mail.eizel.com [122.42.14.121]) by eizel.com (8.9.3/8.9.3) with ESMTP id KAA07391; Sun, 18 Mar 2001 10:48:06 –0500
Mime-Version: 1.0
At 8:22 AM –0500 3/17/01, John Doe wrote:
>The latest revisions look good to me. Let's move ahead with
>this project. Please fax me your itinerary next week
>at 214-987-3334.
John,
I seem to have lost the itinerary. I'll try to get my assistant to
write up a new itinerary and I'll fax it to you as soon as possible.
Harry

---

The categories described earlier are not well suited for email documents. For email, the following categories are more appropriate:

HEADER_BLOCK: The initial set of lines, beginning with a token which ends in a colon.

INCLUDED_MESSAGE: An email or part thereof prefaced by ">" or "|" or another indicative character. This also includes an optional preceding line(s), containing text such as "At [time], [person] wrote:"

MAIN_BODY: The content of the message itself.

Standard parsing algorithms can classify a line from an email, with high accuracy, into one of these categories. (In one example, the parser will have at least a one-line lookahead buffer.)

The main content, in this case, will be at the beginning of the main body. In the example above, this is the line which reads "John,". Given this classification, an automatic document restructuring system can apply the same policies— reorder the content, start at the main content, or insert a link to the main content—to an email document.

The invention claimed is:

1. A method comprising:

receiving an electronic document represented by serial data that contains content of the document and defines an order in which respective portions of the content are to be presented on a display for viewing, analyzing the serial data of the electronic document by at least one transformation module to determine an order of presentation of the portions of the content different from the order defined by the serial data, the different order of presentation being adapted based upon a performance capability of a display of a target device, and generating, via a processor, reorganization information for use in delivering the portions of the content, the reorganization information enabling presentation of the portions in the different order, wherein generating the reorganization information includes adding a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a particular portion of the content that is not at a beginning of the order defined by the serial data, and the destination location being determined based on the content of the serial data and without regard to the ordering of the portions.

2. The method of claim 1 in which the serial data representing the electronic document is expressed in a markup language.

3. The method of claim 2 in which the mark-up language comprises a hypertext markup language.

4. The method of claim 3 in which the hypertext markup language comprises Html.

5. The method of claim 3 in which the markup language comprises PDF, postscript, SGML, Powerpoint, rich text, or unformatted text.

6. The method of claim 2 in which the serial data representing the electronic document is expressed in an electronic mail format.

7. The method of claim 6 in which the electronic mail format includes a header and a main body.

8. The method of claim 6 in which the analyzing includes determining the start of the main body.

9. The method of claim 1 in which the content of the document includes at least one of the following: text, images, tables, frames, and headings.

10. The method of claim 1 in which the order in which the respective portions of the content are to be performed includes a two-dimensional layout.

11. The method of claim 1 in which the reorganization information includes an identification of a relative importance of the respective portions of the content.

12. The method of claim 11 in which the reorganization information includes an identification of a main block of text.

13. The method of claim 12 in which the analyzing includes finding an annotation inserted in the electronic document as a marker of the location of the main block of text.

14. The method of claim 1 in which the reorganization information associates with a revised order for presentation with at least some of the portions of content.

15. The method of claim 1 in which the reorganization information causes an automatic redirection from the first portion of the content to a later portion of the content when the document is opened for presentation by directing a user to the later portion in response to opening of the document.

16. The method of claim 1 in which the different order of performance enabled by the reorganization information is adapted for a display that has a more restricted performance capability than does the performance capability of the display for which the document was originally designed.

17. The method of claim 16 in which the more restricted display is part of a mobile phone or personal digital assistant, and the display for which the document was originally designed comprises a desktop computer monitor.

18. The method of claim 1 in which presentation of the portions of the content comprises presenting the portions by speech synthesis.

19. The method of claim 1 in which analyzing includes identifying one of the portions as containing central content of the document.

20. The method of claim 19 in which generating includes inserting a hyperlink to point to the beginning of the main content portion.

21. The method of claim 19 in which generating includes moving the central content portion to near the beginning of the document.

22. The method of claim 19 in which generating includes altering the document so that the main content portion appears first when the document is presented.

23. The method of claim 1 in which analyzing includes identifying portions of the document that should not be separated in generating the reorganization information.

24. The method of claim 23 in which the portions that should not be separated include at least one of the following pairs: heading and text, image and caption, or paragraph and related paragraph.

25. The method of claim 1 in which analyzing includes identifying portions of the document that should not be moved relative to other portions of the document.

26. The method of claim 1 in which analyzing includes identifying portions of the document that should be moved relative to other portions in generating the reorganization information.

27. The method of claim 26 in which the portions that should be moved comprise images or tables.

28. The method of claim 1 in which analyzing includes identifying regions according to functions.

29. The method of claim 28 in which the functions include navigation and content.

30. The method of claim 1 in which the analyzing includes converting the document to a tree format.

31. The method of claim 1 in which the analyzing includes blocking major regions of the document by dividing the major regions into respective blocks.

32. The method of claim 1 in which the analyzing includes counting characters of text.

33. The method of claim 1 in which the reorganization information includes an annotation, the annotation identifying a portion of content and causing the target device to start directly at the portion of content when a user requests the electronic document.

34. A method comprising:

receiving a request from a remote device for a portion of a document represented by serial data that contains content of the document and defines an order in which respective portions of the content are to be presented on a display for viewing, and in response to the request, analyzing the serial data of the electronic document by at least one transformation module to determine an order of presentation of the portions of the content different from the order defined by the serial data, the different order of presentation being adapted based upon a performance capability of a display of a target device, and returning at least one and fewer than all of the portions of the content using reorganization information that enables presentation of the portions in the different order, wherein returning at least one and fewer than all of the portions of the content includes adding a hyperlink to a first sub-document of the portions in the different order, the adding of the hyperlink being performed, via a processor, in response to determining that a location of the hyperlink is separated by at least a predetermined distance from a destination location to which the hyperlink points, the hyperlink being displayed near the beginning of the first sub-document of the portions in the different order, the destination location of the hyperlink being a location of a particular portion of the content that is not at a beginning of the order defined by the serial data, and the destination location being determined based on the content of the serial data and without regard to the ordering of the portions.

35. The method of claim 34 also including receiving other requests for portions of the content of the document, and in response to the requests, returning other portions of the content using the reorganization information.

36. A data structure stored on a medium and capable of configuring a machine to respond to requests for portions of a document that is represented by serial data that includes content of the document and defines an order in which respective portions of the content are to be presented, the data structure comprising reorganization information that enables presentation of the portions in an order different from the order defined by the serial data, the reorganization information having been generated based on an analysis of the serial data by at least one transformation module to determine the different order of presentation, wherein the analysis of the serial data also includes adding a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a particular portion of the content that is not at a beginning of the order defined by the serial data, and the destination location being determined based on the content of the serial data and without regard to the ordering of the portions, the different order of presentation being adapted based upon a performance capability of a display of a target device.

37. The data structure of claim 36 also including the content, the data being expressed as a modified version of an original data structure that expressed the document.

38. The data structure of claim 37 in which the modified version includes annotations.

39. The data structure of claim 36 in which the reorganization information associates a revised order for presentation with at least some of the portions of content.

40. The data structure of claim 36 in which the reorganization information causes an automatic redirection from the first portion of the content to a later portion of the content when the document is opened for presentation.

41. The data structure of claim 36 in which the different order of presentation enabled by the reorganization information is adapted for a display that has a more restricted performance capability than does the performance capability of the display for which the document was originally designed.

42. The data structure of claim 41 in which the more restricted display is part of a mobile phone or personal digital assistant, and the display for which the document was originally designed comprises a desktop computer monitor.

43. The data structure of claim 36 in which presentation of the portions of the content comprises presenting the portions by speech synthesis.

44. An apparatus comprising:

means for receiving an electronic document represented by serial data that contains content of the document and defines an order in which respective portions of the content are to be presented on a display for viewing, means for analyzing the serial data of the electronic document, said means for analyzing comprising at least one transformation module to determine an order of presentation of the portions of the content different from the order defined by the serial data, the different order of presentation being adapted based upon a performance capability of a display of a target device, and means for generating reorganization information for use in delivering the portions of the content, the reorganization information enabling presentation of the portions in the different order, wherein generating the reorganization information includes adding a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a location to a particular portion of the content that is not at a beginning of the order defined by the serial data, and the destination location being determined based on the content of the serial data and without regard to the ordering of the portions.

45. The apparatus of claim 44 in which the different order of presentation enabled by the reorganization information is adapted for a display that has a more restricted performance capability than does the performance capability of the display for which the document was originally designed.

46. The apparatus of claim 45 in which the more restricted display is part of a mobile phone or personal digital assistant, and the display for which the document was originally designed comprises a desktop computer monitor.

47. An apparatus comprising a machine configured to-receive an electronic document represented by serial data that contains content of the document and defines an order in which respective portions of the content are to be presented on a display for viewing, analyze the serial data of the electronic document to determine an order of presentation of the portions of the content different from the order defined by the serial data, and generate reorganization information for use in delivering the portions of the content, the reorganization information enabling presentation of the portions in the different order, wherein being configured to generate reorganization information includes being configured to add a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a particular portion of the content that is not at a beginning of the order defined by the serial data, and the destination location being determined based on the content of the serial data and without regard to the ordering of the portions, the different order of presentation being adapted based upon a performance capability of a display of a target device.

48. The apparatus of claim 47 in which the different order of presentation enabled by the reorganization information is adapted for a display that has a more restricted performance capability than does the performance capability of the display for which the document was originally designed.

49. The apparatus of claim 48 in which the more restricted display is part of a mobile phone or personal digital assistant, and the display for which the document was originally designed comprises a desktop computer monitor.

50. An apparatus comprising:
a display configured to present portions of content of an electronic document in an order different from an order defined by serial data representing the electronic document, the electronic document having been processed according to a method comprising:
receiving an electronic document represented by serial data that contains content of the document and defines an order in which respective portions of the content are to be presented on a display for viewing,
analyzing the serial data of the electronic document by at least one transformation module to determine an order of presentation of the portions of the content different from the order defined by the serial data, the different order of presentation being adapted based upon a performance capability of a display of a target device, and
generating reorganization information enabling presentation of the portions in the different order, wherein generating the reorganization information includes adding a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a particular portion of the content that is not at a beginning of the order defined by the serial data, and the destination location being determined based on the content of the serial data and without regard to the ordering of the portions.

51. The apparatus of claim 50 in which the display of the apparatus for which the reorganization information enables the different order of presentation has a more restricted performance capability than does the performance capability of the display for which the document was originally designed.

52. The apparatus of claim 51 in which the apparatus comprises a mobile phone or personal digital assistant, and the display for which the document was originally designed comprises a desktop computer monitor.

53. A computer program product comprising at least one computer-readable storage medium having computer-readable program code portions stored therein, the computer-readable program code portions comprising:
a first executable portion for receiving an electronic document represented by serial data that contains content of the document and defines an order in which respective portions of the content are to be presented on a display for viewing,
a second executable portion for analyzing the serial data of the electronic document by at least one transformation module to determine an order of presentation of the portions of the content different from the order defined by the serial data, the different order of presentation being adapted based upon a performance capability of a display of a target device, and
a third executable portion for generating reorganization information for use in delivering the portions of the content, the reorganization information enabling presentation of the portions in the different order, wherein generating the reorganization information includes adding a hyperlink to a first sub-document of the portions in the different order, the adding of the hyperlink being performed in response to determining that a location of the hyperlink is separated by at least a predetermined distance from a destination location to which the hyperlink points, the hyperlink being displayed near the beginning of the first sub-document of the portions in the different order, the destination location of the hyperlink being a particular portion of the content that is not at a beginning of the order defined by the serial data, and the destination location being determined based on the content of the serial data and without regard to the ordering of the portions.

* * * * *

UNITED STATES PATENT AND TRADEMARK OFFICE
CERTIFICATE OF CORRECTION

PATENT NO. : 7,565,605 B2  Page 1 of 1
APPLICATION NO. : 09/851404
DATED : July 21, 2009
INVENTOR(S) : Schohn et al.

It is certified that error appears in the above-identified patent and that said Letters Patent is hereby corrected as shown below:

Column 13,

Line 54, before "order" insert --different--;

Line 66, after "associates" cancel "with".

Column 14,

Line 25, "central" should read --main--.

Signed and Sealed this

Sixteenth Day of February, 2010

David J. Kappos
*Director of the United States Patent and Trademark Office*